Patented Sept. 4, 1951

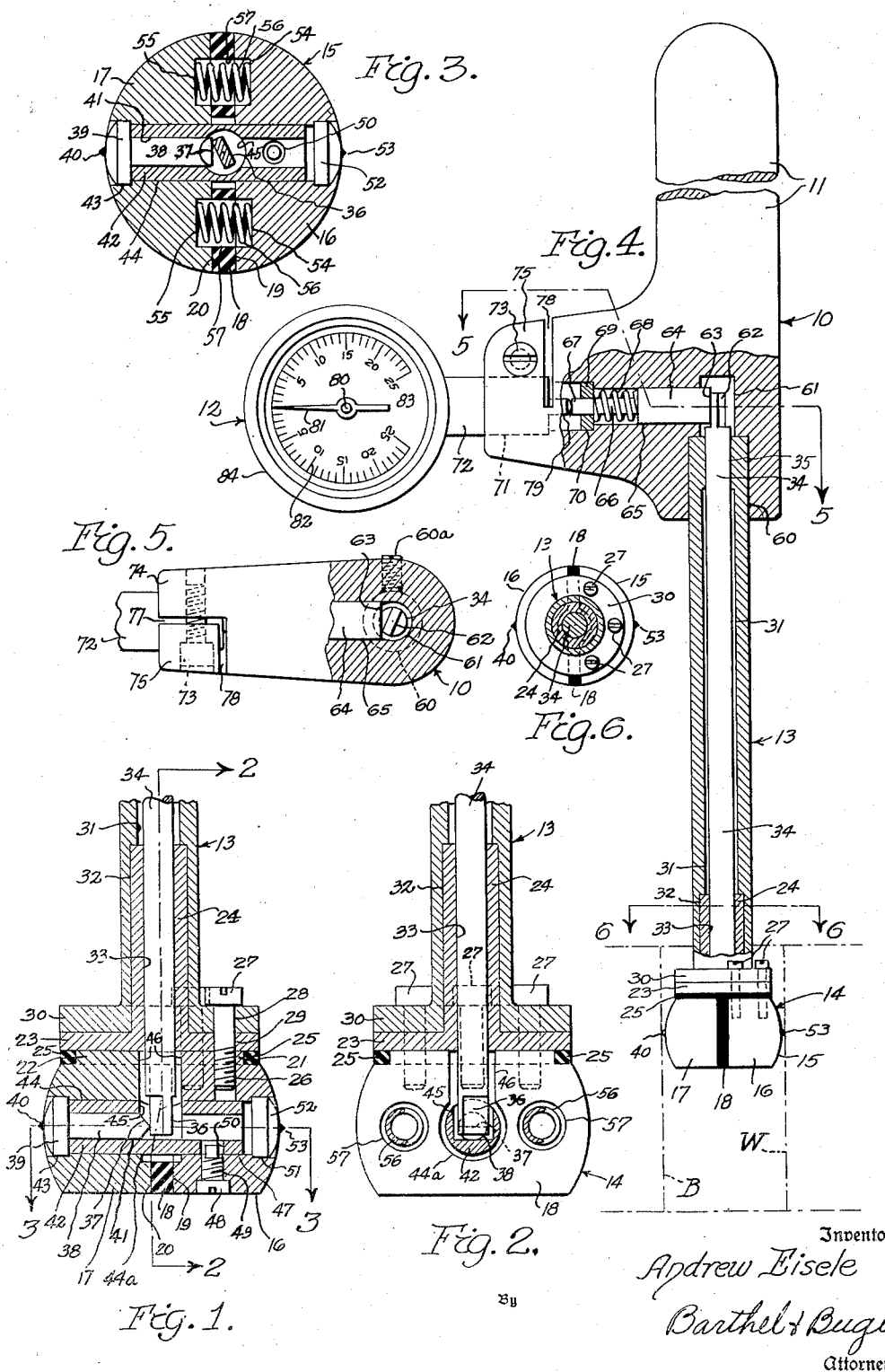

2,566,321

UNITED STATES PATENT OFFICE 2,566,321

SEALED MEASURING HEAD FOR BORE GAUGES

Andrew Eisele, Detroit, Mich.

Application February 3, 1949, Serial No. 74,440

10 Claims. (Cl. 33—178)

This invention relates to internal bore gauges, and in particular, to measuring heads for such gauges.

One object of this invention is to provide an internal bore gauge, the measuring head of which is completely enclosed and entirely sealed so that no dirt or other foreign matter can enter the working parts and interfere with the operation of the gauge.

Another object is to provide an internal bore gauge which will work more quickly and easily than the ordinary plug gauge and will not stick in the bore, the plug gauge having a large amount of surface contact and consequent friction as well as the tendency to expand when it becomes warm, with consequent sticking in the bore.

Another object is to provide an internal bore gauge which is so nearly the diameter of the bore which it is intended to measure that it practically fits the bore and eliminates the necessity for the use of equalizing or centering pins and consequently eliminates the openings required for such pins and the danger of foreign matter entering through such openings.

Another object is to provide an internal bore gauge, one of which is provided for each size of bore to be measured, the bore gauge having a minimum of working parts and hence being subject to a minimum amount of wear.

Another object is to provide an internal bore gauge wherein the measuring head has only one bore extending to the outside of the instrument and consequently has only one location for the entrance of foreign matter, that location being sealed to prevent such entrance of foreign matter.

In the drawings:

Figure 1 is an enlarged central vertical section through the head and stem portion of an internal bore gauge, according to a preferred form of the invention;

Figure 2 is a central vertical section in a plane at right angles to that of Figure 1, taken along the line 2—2 in Figure 1;

Figure 3 is a horizontal section through the bore gauge head taken along the line 3—3 in Figure 1;

Figure 4 is a side elevation, partly in central vertical section, of the complete bore gauge, the head portion of which is shown in Figures 1, 2 and 3;

Figure 5 is a fragmentary top plan view, partly in horizontal section, along the line 5—5 in Figure 4, showing the motion-transmitting mechanism at the upper end of the operating shaft; and Figure 6 is a horizontal section through the operating shaft and supporting stem of the instrument, taken along the line 6—6 in Figure 1.

In the mechanical industries, where the diameters of internal bores are to be measured in rapid succession for large numbers of holes or bores of the same diameter in repetition, such as in the inspection of manufactured parts prior to final assembly, it has hitherto usually been the practice to employ the conventional plug gauges. Such plug gauges, however, have been subject to the disadvantages of rapid wear, of slowness in insertion and withdrawal, and of sticking in the bore when the gauge became heated, as from the heat of the operator's hand. Such gauges also have been slow in use because of foreign matter such as dirt adhering to them and causing difficulty in insertion or withdrawal of the gauge where the fit was close. As a consequence, the ordinary plug gauge has been an unsatisfactory instrument in mass production industries such as the automotive industry. On the other hand, the ordinary internal bore gauge, intended for the measuring of several sizes of bores throughout a considerable range of diameters, is also unsatisfactory for mass production bore gauging since it has many working parts and also has three or four openings through which dirt or other foreign matter can penetrate to the interior of the instrument. Such bore gauges, while satisfactory in tool shops or other non-mass-production work, are unsuited for use by comparatively unskilled or careless workmen, due to the delicate construction of such gauges.

The present invention provides an internal bore gauge which is intended to replace the plug gauge for the same diameter of bore and which will avoid the disadvantages, not only of the ordinary plug gauge but also of the ordinary internal bore gauge when used for mass production gauging. The internal bore gauge of the present invention is made in a range of sizes like the plug gauge, so that one bore gauge is provided for each standard size of bore to be measured, the gauge having a range sufficient to indicate the amount by which the bore is greater or less than the standard diameter. Since the gauge head is made to very nearly the same diameter as the bore to be measured, the equalizing or centering pins ordinarily required can be dispensed with. Accordingly, only one hole is required in the gauge head, namely for the movable measuring pin, and that hole is sealed against entry of dirt or foreign matter. The measuring pins are tipped with an extremely hard wear-resisting substance, such as a diamond, so that repeated gauging produces negligible wear, as well as minimizes friction arising during the gauging operation. The gauge is so constructed that the head and supporting stem are completely enclosed and sealed against the entry of dirt or other foreign matter so that the gauge has a working life which far exceeds that of either the ordinary plug gauge or the ordinary bore gauge, if used for mass production gauging.

Referring to the drawings in detail, Figure 4 shows an internal bore gauge, generally designated 10, according to a preferred form of the invention, as consisting generally of a handle 11 carrying a conventional dial indicator 12 and connected by a tubular stem 13 to a measuring head 14. The head 14 is a partially spherical form and includes a barrel-shaped partially spherical body 15 made up of opposed fixed and movable halves 16 and 17 respectively, separated from one another in a diametral plane by a sealing member or gasket 18 of resilient rubber-like material such as natural or synthetic rubber.

The gasket 18 is of roughly U-shaped form to fit the outline of the opposed inner faces 19 and 20 of the opposed body halves 16 and 17 (Figure 2). The halves 16 and 17 at their upper ends are provided with reduced diameter portions 21 and 22, the upper ends of which engage the flanged portion 23 on the lower end of a tubular member 24 (Figures 1 and 2). The annular recess formed by the reduced diameter portions 21 and 22 is filled by an annular gasket 25 of resilient rubber-like material, such as natural or synthetic rubber.

The fixed head half 16 is provided with threaded screw holes 26 which receive the threaded ends of screws 27 extending downward through holes 28 and 29 in the flanged portions 30 and 23 respectively of the stem 13 and tubular member 24. The tubular member 13 is provided with a central bore 31 opening into an enlarged bore portion or counterbore 32 into which the tubular member 24 is fitted, preferably by a press fit. The tubular member 24 is provided with an internal bore 33 in which an operating shaft or motion-transmitting rod 34 is rotatably mounted, the upper end thereof being rotatably mounted in a similar bore 35 at the upper end of the stem 13.

The lower end of the shaft 34 is provided with a flat plate-like portion 36 which engages the wedge-shaped end 37 of a movable measuring pin 38. In front of the pin 38 is a button-like head 39 carrying a diamond or other hardened contact member 40. The pin 38 is seated in a bore 41 in a sleeve 42 by a press fit, and the head 39 is similarly inserted in a counterbore 43 which opens into a bore 44 (Figure 3) in the movable body half 17. The sleeve 42 in turn is seated in the bore 44, as by a press fit. The sleeve 42 is provided with a vertical bore 45 through which the end 36 of the operating shaft 34 projects downward into contact with the pin 38, and the body halves 16 and 17 are similarly provided with a vertical bore 46, half of which lies within each. Partially surrounding the sleeve 42 at the bottom of the bore 46 is an enlargement 44a of the bore 44 (Figure 2).

The rearward end of the sleeve 42 is slidably received in a bore 47 in the fixed body half 16, and its motion to and fro in a horizontal direction is limited by a stop screw 48 threaded into a screw hole 49 and having its upper or inner end entering an enlarged hole 50. The outer end of the bore 47 is slightly enlarged as at 51 to receive a fixed measuring head 52 provided with a diamond or other hardened contact point 53. The fixed head 52 is preferably inserted in the bore 51 with a press fit.

The fixed and movable body halves 16 and 17 are provided with co-axial sockets 54 and 55 respectively parallel to the bore 44 for receiving compression springs 56. The springs 56 normally tend to urge the movable body half 17 away from the fixed half 16, thereby urging the fixed and movable contact points 53 and 40 into contact with the side walls W of the bore B (Figure 4) to be measured. The gasket 18 is sufficiently resilient to expand or contract so as to fill the gap between the opposed faces 19 and 20 of the halves 16 and 17, the gasket 18 being provided with holes 57 aligned with the sockets 54 and 55 to permit passage of the springs 56.

The upper end of the stem 13 is seated in a counterbore 60 opening into a bore 61 (Figure 4), and is locked in position by a set screw 60a (Figure 5). The bore 61 receives the plate-like upper end 62 of the shaft 34, similar to the portion 36 on the lower end thereof. This in turn engages the inner end 63 of a plunger 64 reciprocably mounted in a horizontal bore 65, the plunger 64 having a reduced diameter portion 66 terminating in a contact end 67. The reduced diameter portion 66 is encircled by a compression spring 68 which is seated against a washer 69 inserted in a counterbore 70 of the bore 65 by a press fit. The spring 68 thus tends to urge the plunger 64 into contact with the end 62 of the shaft 34.

The handle 11 is provided with a further enlarged bore 71 for receiving the hollow stem 72 of the dial indicator 12. The latter is clamped in position by means of a clamping screw 73 interconnecting the fixed and movable halves 74 and 75 of a mounting 76 separated from the main body of the handle 11 by mutually perpendicular slots 77 and 78 respectively (Figure 5). The hollow stem 72 of the dial indicator 12 contains the usual reciprocable operating plunger 79 engageable with the contact end 67 of the plunger 64 and in turn connected through the usual motion-multiplying mechanism to a spindle 80 carrying a pointer or needle 81 registering with a graduated arcuate measuring scale 82 on a dial 83 within a case 84.

In the operation of the internal bore gauge, the particular bore gauge 10 is selected which is constructed for the particular diameter of the bore B. Having previously checked the gauge by a standard bore so as to adjust the needle 81 to read correctly upon the graduated scale 82, or to ascertain its error, the operator grasps the handle 11 and thrusts the measuring head 14 into the bore B to be measured. Assuming that the bore B has a diameter within the range of the travel of the measuring pin 38, the fixed point 53 and movable point 40 will engage the side walls W of the bore B, the movable head half 17 being pushed inward by the contact of the bore wall with the contact points 40 and 53. Thus, the movable half 17 moves toward the fixed half 16 as the rearward end of the sleeve 42 slides in the bore 47 toward the fixed head 52, compressing the sealing gasket 18.

The operator rocks the stem 13 back and forth to center the contact points 40 and 53 in the bore B, noting the reading of the needle 81 upon the graduations 82. The barrel-shaped form of the head 14 permits this rocking action to take place. When the movable head half 17, sleeve 42 and measuring pin 38 are pushed inward by the contact of the diamond points 40 and 53 with the bore walls W, the wedge-shaped end 37 engages the edge of the end portion 36 of the operating shaft 34 (Figure 3), rotating the shaft 34. The rotation of the shaft 34 in this manner swings the edge of the upper plate-like portion 62 against the end 63 of the plunger 64, pushing it to the left against the thrust of the spring 68, and consequently pushing the operating plunger 79 of the dial indicator 12 into its stem 72. The gearing or other multiplying mechanism within the casing 84 of the dial indicator 12 transmits this motion to the spindle 80, rotating the spindle 80 and swinging the needle 81 along the graduated scale 82 until it comes to rest at the graduation indicating the diameter of the bore B, or rather its variation from the desired diameter for the bore B. The graduated scale 82 usually indicates the amount, usually in thousandths of an inch, by which the diameter of the bore B is either oversized or undersized or that it is exactly the desired diameter if the reading is zero. Since the diameter of the head 14 is so nearly the diameter of the bore B, no centering pins are needed.

As the only contact with the bore to be measured is made by the diamond points 40 and 53, there is very little friction arising during the use of the instrument. Consequently, the instrument can be used with the utmost rapidity in moving it into and out of successive bores, taking a reading of the diameter of each bore. Since the moving parts have only a very short permissible distance to move, as determined by the difference in the diameters of the hole 50 (Figure 1) and the upper end of the stop screw 48, the various moving parts move into position with the utmost rapidity. It will be assumed, of course, that the dial indicator scale 82 and the mechanism of the instrument permits measurement of the largest and smallest bores intended to be measured by the instrument, so that the established tolerances lie within the range of the scale 82 on either side of its zero graduation.

While the movable head half 17 has been moving inward in this manner, its upper end slides against the lower surface of the flanged portion 23 (Figure 1), a seal therebetween being maintained by the resilient gasket 25. At the same time, another seal is maintained between the head halves 16 and 17 by the resilient gasket 18. In this way, the instrument is kept completely free from the possible entry of dirt or other foreign matter and at the same time, the largest possible bearing surface is given to the moving parts in the head 14.

When the gauge head 14 is withdrawn from the bore W, the springs 56 (Figure 3) urge the movable half 17 away from the fixed half 16, moving the fixed and movable measuring points 53 and 40 their maximum distance away from one another as permitted by the contact of the upper end of the stop screw 48 within the wall of the enlarged hole 50 (Figure 1). If the dial indicator wears or otherwise becomes inaccurate, it can be removed from the instrument merely by loosening the clamping screw 73 and replacing it with another dial indicator. Furthermore, the handle 11 and its accompanying parts above the counterbore 60 can be standardized for all sizes of gauges, it being necessary to change only the lower portions of the instrument comprising the stem 13 with its operating shaft 34 and measuring head 14 for those of a different diameter.

What I claim is:

1. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, and a resilient expansible sealing element mounted in and yieldably filling the space between said head members in sealing engagement therewith.

2. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, and a resilient expansible sealing element mounted in and yieldably filling the space between said head members in sealing engagement therewith, said head members being of approximately semi-circular cross-section.

3. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, and a resilient expansible sealing element mounted in and yieldably filling the space between said head members in sealing engagement therewith, said head members being approximately half-barrel-shaped.

4. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, and a resilient expansible sealing element mounted in and yieldably filling the space between said head members in sealing engagement therewith, said supporting structure having a transversely arranged abutment portion thereon and said movable head member having a bearing surface arranged in sliding engagement with said abutment portion.

5. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, a resilient expansible sealing element mounted in and yieldably filling the space between said head members in sealing engagement therewith, and a second resilient sealing element mounted between said movable head member and said structure and in sealing engagement therewith.

6. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, a resilient expansible sealing element mounted in and yieldably filling the space between said head members in sealing engagement therewith, said supporting structure having a transversely arranged abutment portion thereon and said movable head member having a bearing surface arranged in sliding engagement with said abutment portion, and a second resilient sealing element mounted between said movable head member and said abutment portion and in sealing engagement therewith.

7. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, one of said head members having a bore therein transverse to said motion-transmitting member, a rod-like element mounted on the other head member and slidably engageable with said transverse bore, and a resilient expansible sealing element mounted in and yieldably filling the space between said head members in sealing engagement therewith.

8. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, one of said head members having a bore therein transverse to said motion-transmitting member, a tubular element mounted on the other head member and slidably engageable with said transverse bore, said bore-contacting element extending through said tubular element into engagement with said motion-transmitting member, and a resilient expansible sealing element mounted in and yieldably filling the space between said head members in sealing engagement therewith.

9. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, one of said head members having a bore therein transverse to said motion-transmitting member, a rod-like element mounted on the other head member and slidably engageable with said transverse bore, a resilient expansible sealing element mounted in and yieldably filling the space between said head members in sealing engagement therewith, and a second resilient sealing element mounted between said movable head member and said structure and in sealing engagement therewith.

10. An internal bore gauge measuring head unit for attachment to the actuating mechanism of a dial indicator having a movable motion-transmitting member associated therewith and projecting therefrom, said head unit comprising a head supporting structure, a movable head member movably mounted on said structure for motion transversely to the axis of said motion-transmitting member and operatively connected to said motion-transmitting member, a fixed head member secured to said structure in laterally spaced relationship with said movable head member, a bore-contacting element on each head member, one of said head members having a bore therein transverse to said motion-transmitting member, a tubular element mounted on the other head member and slidably engageable with said transverse bore, said bore-contacting element extending through said tubular element into engagement with said motion-transmitting member, a resilient expansible sealing element mounted in and yieldably filling the space between said head members in sealing engagement therewith, and a second resilient sealing element mounted between said movable head member and said structure in sealing engagement therewith.

ANDREW EISELE.

REFERENCES CITED

The following references are of record in the file of this patent:

UNITED STATES PATENTS

| Number | Name | Date |
| --- | --- | --- |
| 1,525,511 | Peterson et al. | Feb. 10, 1925 |
| 1,595,368 | Volis | Aug. 10, 1926 |
| 1,619,834 | Stein | Mar. 8, 1927 |
| 2,174,105 | Haury | Sept. 26, 1939 |
| 2,192,900 | Eisele | Mar. 12, 1940 |
| 2,229,587 | Parker | Jan. 21, 1941 |